Sept. 4, 1962 C. D. GILMORE 3,052,195
FLEXIBLE CUTTER DISKS FOR MAKING CRESCENT DOUGHNUTS
Filed Sept. 22, 1961
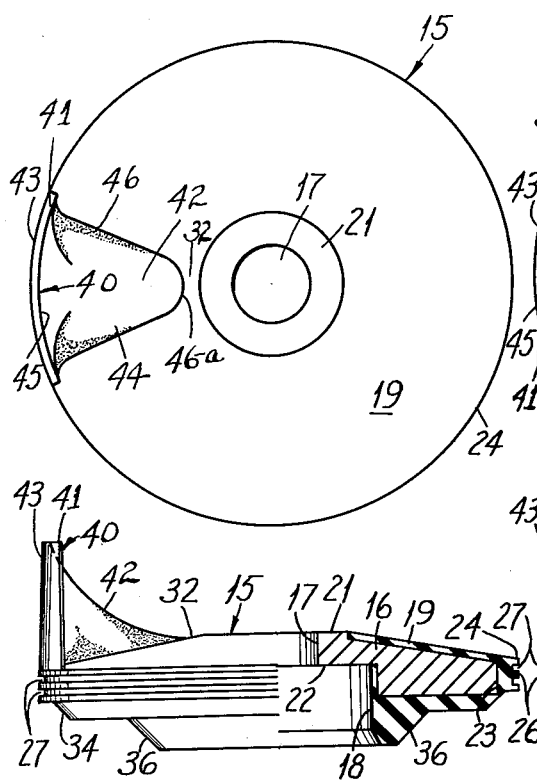
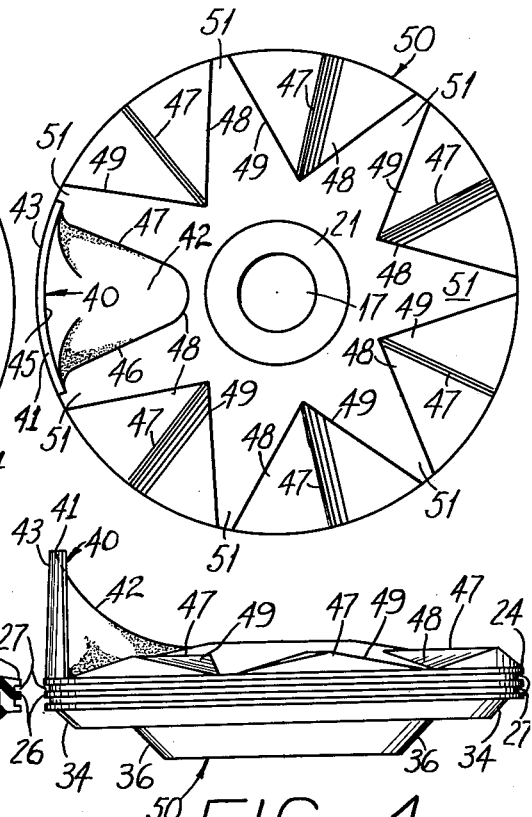
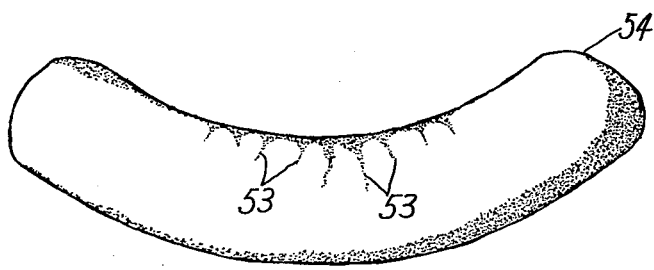
INVENTOR
CHACE D. GILMORE
BY *Richard J. Cowling*
ATTORNEY

United States Patent Office

3,052,195
Patented Sept. 4, 1962

3,052,195
FLEXIBLE CUTTER DISKS FOR MAKING
CRESCENT DOUGHNUTS
Chace D. Gilmore, 219 S. Mechanics St.,
West Chester, Pa.
Filed Sept. 22, 1961, Ser. No. 140,046
4 Claims. (Cl. 107—14)

The present invention relates generally to doughnut formers of the reciprocating type, and it has particular relation to improvements in the construction of a cutting disk for use in such formers for making doughnuts of the type known as "crescent" doughnuts.

Heretofore, doughnut formers have been made with a fixed metal cutting disk having a smooth top, bottom and sides on which were attached, either to the top surface of the disk or to one side of the stem to which the disk was attached a metal plug for dividing the dough ring at the time of its formation and severance. While these plugs were usable for splitting dough rings, they were quite unsatisfactory in many respects, to-wit: They did not cut cleanly. They became worn quickly, and frequently damaged the cutting sleeve. Dough got into the crevices between the cutting disk, stem and/or plug making cleaning difficult and sometimes impossible, which made them quite unsatisfactory from a sanitary standpoint.

With the present invention all of the foregoing disadvantages have been eliminated, and there is provided an integral, flexible cutting disk that will efficiently contact the inner surface of the cutting sleeve with a tight, smooth wiping action, which will insure a clean and efficient division of the forming dough ring into uniformly shaped pieces of dough that will expand in the hot cooking oil into cresent shape doughnuts of a uniform size and desirable shape.

An object of the invention is to provide a flexible integrally formed cutting disk for a conventional doughnut cutter which is capable of forming and cutting raw dough into a split ring formation that will produce "crescent" shaped doughnuts.

Another object of the invention is the provision of a flexible integrally formed cutting disk of the character described which will not only divide the dough ring at the time of its formation but will also stroke and crease the surface of the raw dough to insure more complete and uniform cooking.

A further object of the invention is to provide an integrally formed, flexible cutting disk, not only capable of cutting raw dough forms into pieces for making crescent shaped doughnuts, but also marking said forms with weakening crevices which will not only serve to insure uniform cooking but will also assist in controlling the final shape of the finished product.

Other and further objects and advantages of the invention reside in the detailed construction of the several disks, which result in simplicity, economy and efficiency, and which will be readily apparent from the following detailed descriptions, wherein preferred forms of embodiment of the invention are shown, reference being had to the accompanying drawings, forming a part hereof, wherein like numerals indicate like parts, in which:

FIGURE 1 is a top plan view of a flexible cutting disk embodying the principles of the invention;

FIGURE 2 is a side elevational view, partially in cross-section, of the cutting disk shown in FIGURE 1;

FIGURE 3 is a top plan view of a modified form of cutting disk in which the upper surface thereof is provided with a series of circumferentially spaced ridges extending radially inwardly from the outer peripheral edge thereof;

FIGURE 4 is a side elevational view of the cutting disk shown in FIGURE 3; and

FIGURE 5 is a top plan view of a cooked crescent shape doughnut of the type produced with the cutting disks forming the invention.

Referring now to the drawings, and particularly FIGURES 1 and 2, there is shown a cutter disk 15 embodying the principles of the invention. The disk 15 is capable of use with a conventional reciprocable tubular cutting sleeve (not shown), and includes a metal core 16, preferably of cold rolled steel or any other suitable material, having a relatively small bore 17 extending axially therethrough and a relatively large axial recess or counterbore 18 extending inwardly from the bottom thereof. The bore 17 is adapted to fit over the stem of a conventional cutter, which stem has a reduced threaded lower free end adapted to project through the axial bore 17. A nut (not shown) is threaded over the reduced threaded end to secure the disk 15 against the shoulder formed on said stem by its reduced threaded end, and, when tightly fitted thereon, the nut is threaded within the relatively large recess or counterbore 18.

An envelope, casing or covering 19 of a suitable tough elastic or resilient material, as for example an oil resistant synthetic rubber such as neoprene, buta-diene or other similar material, is bonded to the exterior surface of the core 16 in any suitable manner, as for example by vulcanization, so completely as to cover the exterior surfaces thereof except for the top area 21 adjacent the bore 17 and the bottom area 22 forming the inner base of the counterbore 18. These surfaces are obviously not covered with said flexible material in order to provide a hard surface against which the cutter disk 15 may be drawn tightly and rigidly between the shoulder on the lower end of the stem and its fastening nut (not shown).

The casing or envelope 19 extends beyond the peripheral edge 23 of the metal core 16 to provide a peripheral cutting edge 24, which is flexible with respect of the remainder of said cutting disk 15. It will be obvious that the cutting edge 24 provides a flexible, sealable and yielding contact with the lower knife edge of a conventional reciprocating cutting sleeve, thereby providing a shearing contact and a wiping action with the inner surface of said sleeve.

The cutting edge 24 is provided with a series of alternately spaced annular ribs 26 and grooves 27, which further increases the flexibility of said cutting edge 24 and provides less frictional drag while improving its flexibility, sealing and wiping action over the inner surface of the longitudinally reciprocating cutting sleeve. This feature of the disk forms the subject-matter of my co-pending application Serial No. 140,044 filed September 22, 1961.

It will be noted that the upper surface area of the disk 15 slopes or is inclined upwardly and outwardly, as indicated at 32, from the peripheral edge 24 to the top axial plain area 21, and that its bottom surface area tapers downwardly and inwardly, as indicated at 34. A raised ring or buffer area 36 is also provided adjacent the counterbore 18 to provide a suitable protective buffer against damage of the disk 15 in the event the cutter assembly dropped after it is removed from its former.

On the upper surface 32 of the disk 15, there is provided an integrally formed upstanding projection 40, which has a base that extends arcuately along approximately one-sixth of the circumference of the peripheral flexible cutting edge 24 of the disk 15. This projection 40 extends upwardly a distance substantially equal to the thickness of the disk 15, and, its top edge 41, is relatively thin in cross-section. The back or outer side 43 of the projection 40 is inclined slightly inwardly to provide a lead-in clearance to facilitate passage of the cutting sleeve of a conventional reciprocating cutter thereover. The inner surface of the projection 40 has a ridge 42 extending inwardly radially to substantially the plain area 21 thereof, said ridge being integrally formed with the inner side 45 of the projection 40 over a major surface area thereof. This ridge 42 tapers arcuately downwardly, as best shown in FIGURE 2, and its opposite sloping sides 44 and 46 tend to converge radially inwardly, as best shown in FIGURE 1, where they form a rounded nose portion 46, a merging with the top surface 32.

There is shown in FIGURES 3 and 4 a modified form of disk 50, wherein the upper surface area between the projection 40 and the plain area 21 is covered with a series of circumferentially spaced ridges 47. The ridges 47 have their high point adjacent the peripheral edge 24 of the disk and taper slightly inwardly, the sides 48 and 49 thereof converge inwardly, thereby forming a valley 51 between each adjacent pair of ridges 47 that converges outwardly, or in the opposite direction towards the peripheral edge 24. This basic construction forms the subject-matter of my co-pending application Serial No. 140,043 filed September 22, 1961.

In the operation of the disks 15 and 50, they are to be mounted on the stem of a conventional doughnut cutter (not shown) in a conventional manner, as hereinbefore described. When the dough is extruded as a ring through the die tube (not shown) and over either the disks 15 or 50, the ridge 41 of the arcuate projection 40 will cut or divide the dough ring being severed by the cutting sleeve to form a vertically split ring, which while gravitating into the hot cooking oil will tend to open up into an elongated shape substantially cylindrical in cross-section. However, the time between severance and falling into the hot cooking oil is too short for the split ring to open into a straight piece, and, when it is submerged momentarily in the hot cooking oil, the temperature thereof causes it to expand and become form-retaining while still in its crescent shape. Hence, the name "crescent" doughnuts.

The pressure of the dough being extruded through the die tube of the cutter assembly will force the back 43 of the projection 40 tightly and firmly against the inner surface of the cutting sleeve, insuring that a perfect seal is created therebetween whereby the dough ring is cut cleanly and squarely. With this invention, there are no raw dough strings hanging from the ends of the split ring form, and the split ring will drop flat into the hot cooking oil. No dough can get between the inside surface of the cutter sleeve and the projection 40, which can cause unsanitary conditions that are to be avoided.

The ridges 47 will mark or crease the dough ring as it moves thereover. When the split dough ring tends to straighten out, these markings appear as longitudinally spaced transverse lines. These lines 53 do not distract from the over all appearance of the finished doughnut 54, which is shown in FIGURE 5. In fact, these lines or depressions 53 tend to insure a more even expansion and a more uniform cooking. The raw dough piece is weakened or reduced in cross-sectional area at the points where the dough is most heavily compacted, i.e. at the inner curves, and hence facilitate expansion at such congested area, which results in a more uniformly shaped "crescent" doughnut.

Although only two modifications of the invention have been shown and described in detail, it will be readily apparent to those skilled in the art that the invention is not so limited, but that various other modifications may be made therein without departing from the spirit thereof or from the scope of the appended claims.

What I claim is:

1. A cutting disk for reciprocating doughnut formers of the character described comprising a core of a solid material having an axial bore therethrough and a covering of a tough oil resistant flexible material bonded thereto on its opposite sides and enclosing its peripheral edge to provide a flexible cutting extension therefor, the top side of said disk having an arcuate upstanding projection formed integrally with said covering and extending upwardly in substantially vertical alignment with the peripheral edge of said flexible cutting extension, the arcuate peripheral base edge of said projection being relatively short as compared to the peripheral edge of said flexible cutting extension.

2. A cutting disk for reciprocating doughnut formers of the character described comprising a core of a solid material having an axial bore therethrough and a covering of a tough oil resistant flexible material bonded thereto on its opposite sides and enclosing its peripheral edge to provide a flexible cutting extension therefor, the top side of said disk having an arcuate upstanding projection formed integrally with said covering and extending upwardly in substantially vertical alignment with the peripheral edge of said flexible cutting extension, the arcuate peripheral base edge of said projection being relatively short as compared to the peripheral edge of said flexible cutting extension, said projection being inclined slightly inwardly to provide a lead-in clearance for a cutting sleeve.

3. A cutting disk for reciprocating doughnut formers of the character described comprising a core of a solid material having an axial bore therethrough and a covering of a tough oil resistant flexible material bonded thereto on its opposite sides and enclosing its peripheral edge to provide a flexible cutting extension therefor, the top side of said disk having an arcuate upstanding projection formed integrally with said covering and extending upwardly in substantially vertical alignment with the peripheral edge of said flexible cutting extension, the arcuate peripheral base edge of said projection being relatively short as compared to the peripheral edge of said flexible cutting extension, said projection having an integrally formed ridge extending radially inwardly towards said bore.

4. A cutting disk for reciprocating doughnut formers of the character described comprising a core of solid material having an axial bore therethrough and a covering of a tough oil resistant flexible material bonded thereto on its opposite sides and enclosing its peripheral edge to provide a flexible cutting extension therefor, the top side of said disk having an arcuate upstanding projection formed integrally with said covering and extending upwardly in substantially vertical alignment with the peripheral edge of said flexible cutting extension, the arcuate peripheral base edge of said projection being relatively short as compared to the peripheral edge of said flexible cutting extension, said projection having an integrally formed ridge extending radially inwardly towards said bore, said ridge being tapered downwardly and having outwardly sloping sides that converge radially inwardly towards said bore.

References Cited in the file of this patent

UNITED STATES PATENTS

| | | |
|---|---|---|
| Re. 19,557 | Baumann | May 7, 1935 |
| 1,814,951 | Miller | July 14, 1931 |
| 2,126,416 | Schlichter | Aug. 9, 1938 |
| 2,148,236 | Hanle | Feb. 21, 1939 |